United States Patent
Cheung et al.

(10) Patent No.: US 10,660,341 B2
(45) Date of Patent: May 26, 2020

(54) COUNTER-ROTATING DOUGH MAKING MECHANISM

(71) Applicant: Huiyang Allan Plastic & Electric Industries Co., Limited, Huizhou, Guangdong (CN)

(72) Inventors: Shu Sang Cheung, Huizhou (CN); To Yin Pang, Huizhou (CN)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 365 days.

(21) Appl. No.: 15/700,027

(22) Filed: Sep. 8, 2017

(65) Prior Publication Data

US 2018/0084788 A1 Mar. 29, 2018

(30) Foreign Application Priority Data

Sep. 27, 2016 (CN) .......................... 2016 1 0852229

(51) Int. Cl.
*A21C 1/02* (2006.01)
*A21C 1/14* (2006.01)
(Continued)

(52) U.S. Cl.
CPC .............. *A21C 1/1415* (2013.01); *A21C 1/02* (2013.01); *A21C 1/1405* (2013.01);
(Continued)

(58) Field of Classification Search
CPC ....... A21C 1/1415; A21C 1/1405; A21C 1/02; A21C 1/1465; A21C 1/145; A21C 1/141;
(Continued)

(56) References Cited

U.S. PATENT DOCUMENTS

| 5,380,086 A * | 1/1995 | Dickson ................... A21C 1/14 241/101.2 |
| 2014/0219045 A1* | 8/2014 | Cheung .................. A47J 43/085 366/97 |
| 2016/0256008 A1* | 9/2016 | Dickson, Jr. .............. F16P 1/00 |

FOREIGN PATENT DOCUMENTS

| CN | 20112335232 U | 9/2011 |
| CN | 20132614536 U | 9/2013 |
| CN | 20142301124 U | 6/2014 |

OTHER PUBLICATIONS

Machine translation for CN203860337 (U) (Year: 2019).*

* cited by examiner

*Primary Examiner* — Huy Tram Nguyen
(74) *Attorney, Agent, or Firm* — Intellectual Property Law Group LLP

(57) ABSTRACT

A counter-rotating dough making mechanism, including a drive shaft (9) that is provided with an upper dough hook assembly (1) and a lower dough hook assembly (2) is disclosed. The lower dough hook assembly (2) is preferably provided with a stir plate (3) which enhances the thorough mixing of flour during dough kneading. The upper dough hook assembly (1) and the lower dough hook assembly (2) are connected by gears (42*a*, 42*b*, 42*c*) so that they rotate synchronously but in the opposite direction. By the counter-rotating action of the upper dough hook assembly (1) and the lower dough hook assembly (2), the dough making process is more effective as compared to the usual single piece dough hook as used in many stand mixers. The design and construction of the disclosed counter-rotating dough making mechanism is simple, robust, and reliable, and can deliver superior performance in dough making.

17 Claims, 4 Drawing Sheets

(51) Int. Cl.
*A47J 43/07* (2006.01)
*A47J 43/08* (2006.01)
*B01F 7/16* (2006.01)
*B01F 7/00* (2006.01)
*B01F 15/00* (2006.01)

(52) U.S. Cl.
CPC ......... *A21C 1/1465* (2013.01); *A47J 43/0722* (2013.01); *A47J 43/082* (2013.01); *A47J 43/085* (2013.01); *B01F 7/00325* (2013.01); *B01F 7/166* (2013.01); *B01F 7/00233* (2013.01); *B01F 2015/00623* (2013.01)

(58) Field of Classification Search
CPC .................. B01F 7/00325; B01F 7/166; B01F 2015/00623; B01F 7/00233; A47J 43/082; A47J 43/085; A47J 43/0722
USPC .......................................................... 366/97
See application file for complete search history.

COUNTER-ROTATING DOUGH MAKING MECHANISM

CROSS-REFERENCE TO RELATED APPLICATION

This application claims benefit of China patent application no. 201610852229.7 filed Sep. 27, 2016, the disclosure of which his hereby incorporated by reference in its entirety for all purposes.

BACKGROUND OF THE INVENTION

1. Field of Invention

The invention relates to the field of small household electrical appliances and, in particular, to an improved dough making mechanism that can provide flour mixing and dough kneading actions.

2. Background

Existing flour mixing and dough kneading machines usually provide a motor with a dough hook driving mechanism utilizing a single dough hook. However, the single dough hook has a limited ability to thoroughly mix the water, flour, and other ingredients. The kneading action is also unsatisfactory as the dough often rotates together with the dough hook, which results in a poor kneading action.

The existing technology of flour and stir tools, such as China patent CN201320614536 (a double hook type dough hook), CN201420301124 (a kind of food kneading equipment) and CN201120335232 (a dough hook structure) disclose a first and second massage face.

However, the dough tool is essentially a one-piece unitary construction, driven by the motor to rotate in the work bowl containing flour and water. As such, the existing performance limitation exhibited in the conventional dough hook is still evident.

Another type of flour and stir tool (U.S. Pat. No. 5,380,086) is provided with two agitating arms of the same shape or different shape at the upper or lower ends of the central body, and the center of the container wall is provided with ribs to enhance the contact between the dough and the kneading surface hook, thereby improving the kneading effect. But again, the dough hook rotation is in one direction only.

SUMMARY OF THE INVENTION

In order to solve this technical problem, the invention provides a counter-rotating dough making mechanism according to an embodiment, comprising: an upper dough hook assembly, a lower dough hook assembly and a gearing assembly in a coaxial arrangement about a drive shaft. The gearing assembly is further arranged between the upper dough hook assembly and the lower dough hook assembly to transfer rotational movement between the assemblies. The mechanism of the present invention solves the technical problems of existing dough making devices in that the mixing or kneading effect is limited by the uni-directional rotation of the dough hook.

Technical problems to be solved by the invention are realized through the following technical scheme: A counter-rotating dough making mechanism, including a drive shaft and the drive shaft is provided with an upper dough hook assembly and a lower dough hook assembly in turn, below the lower dough hook assembly is provided a stir plate which allows the flour to concentrate relatively during agitation, the stir plate is fixedly connected with the lower dough hook assembly.

A gearing assembly is arranged between the upper dough hook assembly and the lower dough hook assembly. The upper dough hook assembly, the lower dough hook assembly and a gearing assembly are arranged coaxially about the drive shaft. The rotation direction of the upper dough hook assembly is opposite to the lower dough hook.

The lower dough hook assembly is connected with the bottom end of the drive shaft, and the gearing assembly transfers drive from the lower dough hook assembly to the upper dough hook assembly. The stir plate is fixed below the lower dough hook assembly and rotates with the lower dough hook assembly.

Further, the upper dough hook assembly comprises an upper dough hook hub and an upper dough hook; the lower dough hook assembly comprises a lower dough hook hub and a lower dough hook.

The gearing assembly is arranged between the upper dough hook hub and the lower dough hook hub. The upper dough hook hub, gearing assembly and lower dough hook hub are coaxially arranged.

Further, the gearing assembly part comprises a bevel gear holder and a bevel gear set, and the bevel gear set is mounted on the bevel gear holder.

Further, the bevel gear set includes three bevel gears. Each bevel gear comprises a gear, a gear shaft and a gear sleeve. The gear shaft is embedded in the gear sleeve through the gear, and the gear rotates freely on the gear shaft. Gear grooves are arranged on the bottom surface of the upper dough hook hub and the upper surface of the lower dough hook hub respectively.

Further, a coupling ring is arranged between the drive shaft and the upper dough hook hub. The upper dough hook hub is connected with the lower end of the coupling ring. The lower dough hook hub and the upper dough hook hub are sequentially nested on the coupling ring A washer is arranged between the drive shaft and coupling ring, a shaft ring is arranged at the lower end of the drive shaft.

Embodiments of the invention provide a counter-rotating dough making mechanism where the upper dough hook and lower dough hook rotate synchronously but in the opposite direction.

Due to the counter-rotating nature of the upper and lower dough hook motion, the level of vibration is much improved as compared to conventional uni-directional dough making. The whole structure of the invention is simple and reliable, and provides superior dough making performance.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

Figure 1:
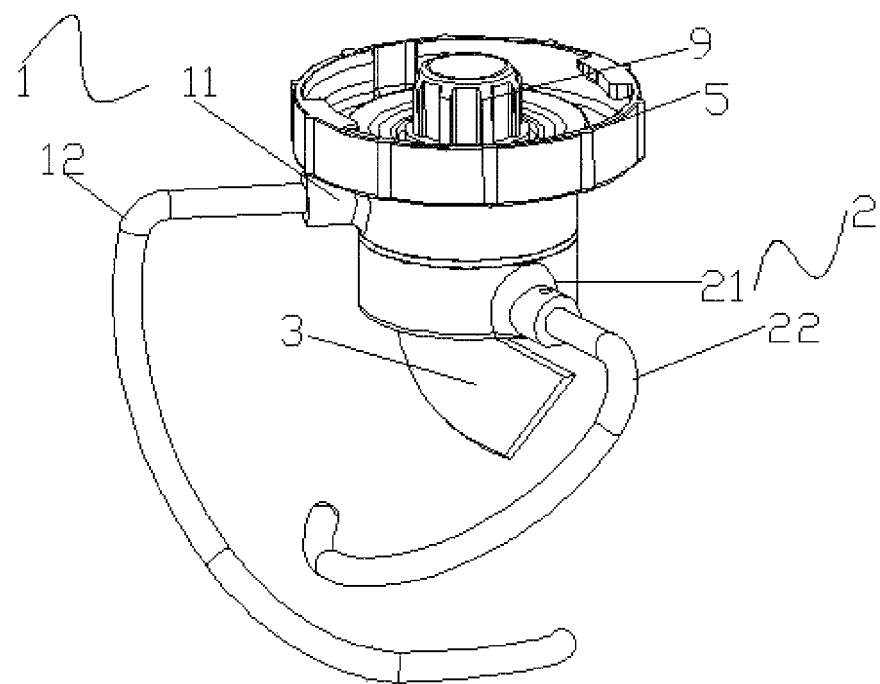
FIG. 1 is a schematic view of the overall structure of a counter-rotating dough making mechanism according to an embodiment of the present invention.
Figure 2:
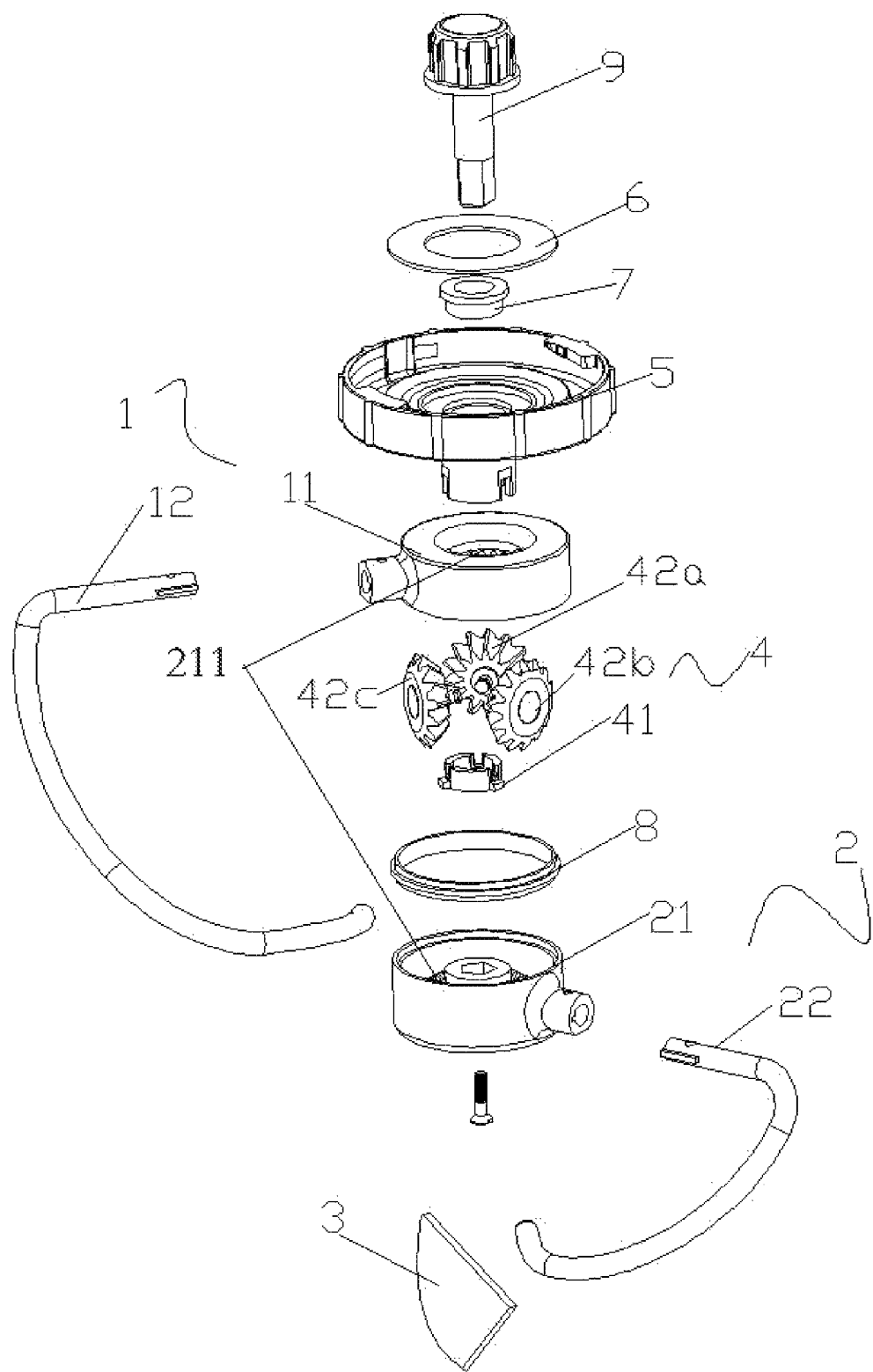
FIG. 2 is an exploded view of the overall structure of the counter-rotating dough making mechanism according to an embodiment of the present invention.
Figure 3:
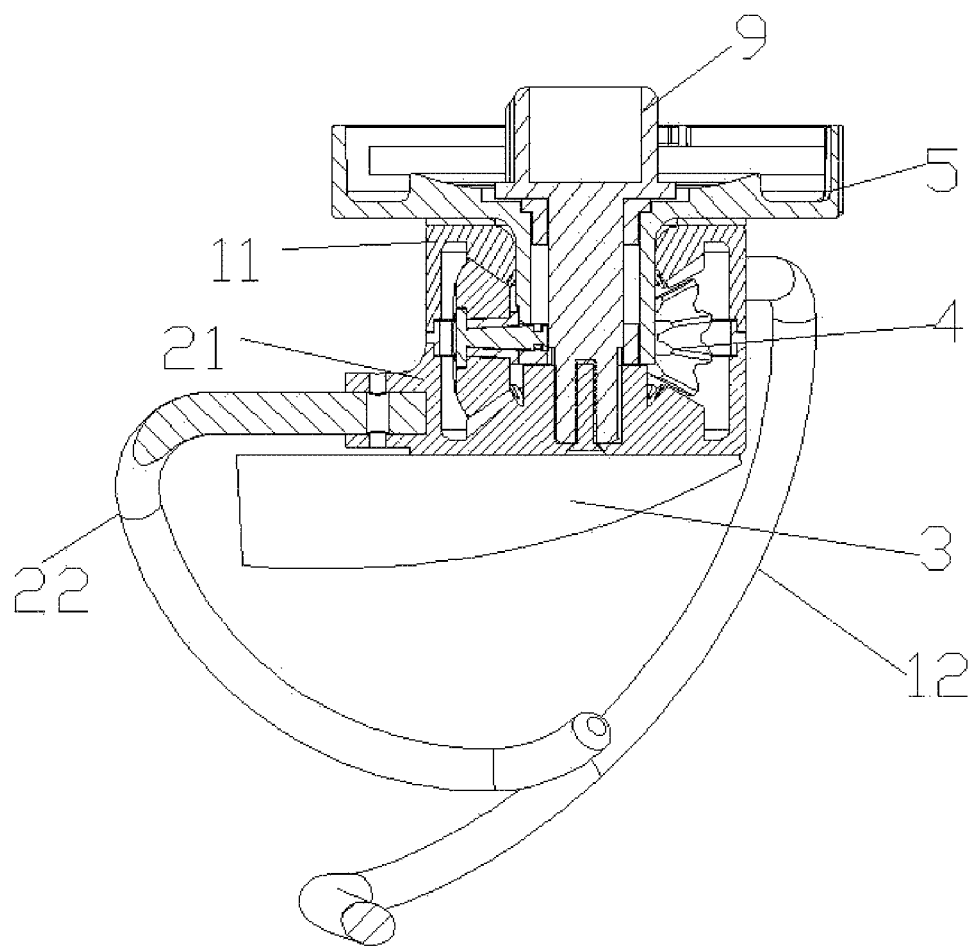
FIG. 3 is a schematic cross-sectional view of the counter-rotating dough making mechanism according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

FIGS. 1-4 show a preferred embodiment of the counter-rotating dough making mechanism of the present invention. The embodiment includes a drive shaft 9 about which are provided an upper dough hook assembly 1 and a lower dough hook assembly 2 in turn.

Below the lower dough hook assembly 1 is provided a stir plate 3, which helps to form the dough. The stir plate is fixedly connected with the lower dough hook assembly.

A gearing assembly 4 is arranged between the upper dough hook assembly 1 and the lower dough hook assembly 2. The upper dough hook assembly and the lower dough hook assembly rotate synchronously but in opposite directions.

The gearing assembly 4, the upper dough hook assembly 1 and the lower dough hook assembly 2 are arranged coaxially. The lower dough hook assembly 2 is connected with the bottom end of the drive shaft 9. The gearing assembly 4 drives the upper dough hook assembly 1 and the lower dough hook assembly 2 to rotate in the reverse directions. The stir plate 3, which is fixed below the lower dough hook assembly, rotates with the lower dough hook assembly.

The upper dough hook assembly 1 comprises an upper dough hook hub 11 and an upper dough hook 12, and the upper dough hook is preferably detachably connected to the upper dough hook hub.

The lower dough hook assembly 2 comprises a lower dough hook hub 21 and a lower dough hook 22, and the lower dough hook is preferably detachably connected to the lower dough hook hub.

The gearing assembly 4 is arranged between the upper dough hook hub 11 and the lower dough hook hub 21. The upper dough hook hub 11, gearing assembly 4 and lower dough hook hub 21 are coaxially arranged about the drive shaft 9.

The upper dough hook 12 and the lower dough hook 22 with the drive shaft 9 as the center of a certain radius of the inner bend. Normally the inner curvature of the upper dough hook 12 and the lower dough hook 22 is between 45° to 90°. The inner curvature of the upper dough hook and the lower dough hook in this example was 75°.

During the operation, the upper and lower upper dough hooks 12, 22 are rotated in opposite directions. The upper dough hook 12 and lower dough hook 22 rotates synchronously in the opposite direction without interference.

The gearing assembly 4 comprises a bevel gear holder 41 and a bevel gear set, and the bevel gear set is mounted on the bevel gear holder.

In the shown embodiment, the bevel gear set includes three bevel gears, namely, bevel gear A 42a, bevel gear B 42b, bevel gear C 42c.

Figure 4:
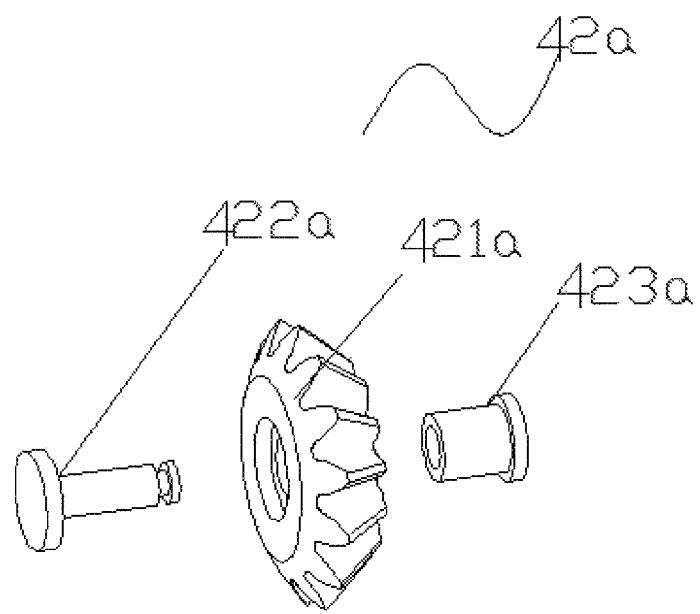
FIG. 4 is a schematic view of a bevel gear structure of the counter-rotating dough making mechanism according to an embodiment of the present invention.

Each bevel gear comprises a gear, a gear shaft and a gear sleeve, by way of example FIG. 4 shows the components of bevel gear A as comprises a gear 421a, a gear shaft 422a and a gear sleeve 423a. The gear shaft is embedded in the gear sleeve through the gear, and the gear is freely rotated on the gear shaft.

Gear grooves 211 are arranged on the bottom surface of the upper dough hook hub 11 and the upper surface of the lower dough hook hub 21.

The bevel gear set is free to rotate, but cannot move horizontally or vertically; the gear grooves 211 are arranged on the bottom surface of the upper dough hook hub and the upper surface of the lower dough hook hub.

A partition ring 8 is arranged between the upper and lower dough hook hubs. The partition ring 8 provides better sealing between the upper and lower dough hook hubs 11, 21 and facilitates relatively smooth rotation.

Under the motor power drive, using the gearing assembly 4 to transfer drive from the lower dough hook hub 21 to the upper dough hook hub 11, counter-rotation of the upper and lower dough hook 12, 22 is achieved.

A coupling ring 5 is arranged between the drive shaft 9 and the upper dough hook hub 11. The upper dough hook hub 11 is connected with the lower end of the coupling ring 5. The lower dough hook hub 21 and the upper dough hook hub 11 are sequentially nested on the coupling ring 5, so that the upper dough hook hub and the lower dough hook hub are fixed on the drive shaft 9.

A shaft ring 7 is arranged at the lower end of the drive shaft 9, and a washer 6 is arranged between the drive shaft 9 and the coupling ring 5.

Embodiments of the invention provide a counter-rotating dough making mechanism; by using a gearing assembly located between the upper dough hook assembly and the lower dough hook assembly rotate synchronously in the opposite direction, thereby achieving an improved dough kneading action.

Another advantage of the present invention is the naturally balanced motion of the counter-rotating upper and lower dough hook. A further advantage of the present invention is the compactness of the assembly.

Although the description of the present invention is carried out in combination with the specific embodiment, it is obvious to those familiar with the technical field that the concept layout can be changed and modified while achieving the same effect. Therefore, all such alternatives, improvements and changes are within the scope of the claimed invention.

REFERENCE NUMERALS

1 first or upper dough hook assembly
11 first or upper dough hook hub
12 first or upper dough hook
2 second or lower dough hook assembly
21 second or lower dough hook hub
211 gear groove
22 second or lower dough hook
3 stir plate
4 gearing assembly part
41 bevel gear holder 42a bevel gear A
42b bevel gear B
42c bevel gear C
421a gear
422a gear shaft
423a gear sleeve
5 coupling ring
6 washer
7 shaft ring
8 partition ring
9 drive shaft

What is claimed is:

1. A counter-rotating dough making mechanism comprising:
an upper dough hook assembly (1), a lower dough hook assembly (2) and a gearing assembly (4) in a coaxial arrangement about a drive shaft (9),
a stir plate (3) attached to the lower dough hook assembly (2) and which does not interfere with the rotation of the upper dough hook assembly (1); and
wherein the gearing assembly (4) is arranged between the upper dough hook assembly (1) and the lower dough hook assembly (2) to transfer rotational movement between the assemblies (1, 2).

2. The counter-rotating dough making mechanism of claim 1, wherein the drive shaft is operably connected to the lower dough hook assembly (2).

3. The counter-rotating dough making mechanism of claim 1, wherein the gearing assembly is arranged such that the upper dough hook assembly (1) and the lower dough hook assembly (2) rotate in opposite directions.

4. The counter-rotating dough making mechanism of claim 2, wherein the gearing assembly is arranged such that the upper dough hook assembly (1) and the lower dough hook assembly (2) rotate in opposite directions.

5. The counter-rotating dough making mechanism of claim 1, wherein the stir plate (3) is in a triangular shape.

6. The counter-rotating dough making mechanism of claim 1, wherein the upper dough hook assembly (1) comprises an upper dough hook (12) detachably connected to an upper dough hook hub (11); and
the lower dough hook assembly (2) comprises a lower dough hook (22) detachably connected to a lower dough hook hub (21).

7. The counter-rotating dough making mechanism of claim 1, wherein the gearing assembly (4) comprises a bevel gear set mounted on a bevel gear holder (41).

8. The counter-rotating dough making mechanism of claim 6, wherein the gearing assembly (4) comprises a bevel gear set mounted on a bevel gear holder (41).

9. The counter-rotating dough making mechanism of claim 7, wherein the bevel gear set includes three bevel gears (42a, 42b, 42c); and each bevel gear comprises a gear shaft (422a) embedded in a gear sleeve (423c) through a gear (421a) such that the gear is freely rotatable on the gear shaft.

10. The counter-rotating dough making mechanism of claim 8, wherein the bevel gear set includes three bevel gears (42a, 42b, 42c); and each bevel gear comprises a gear shaft (422a) embedded in a gear sleeve (423c) through a gear (421a) such that the gear is freely rotatable on the gear shaft.

11. The counter-rotating dough making mechanism of claim 9, wherein the stir plate (3) is in a triangular shape.

12. The counter-rotating dough making mechanism of claim 6, further comprising gear grooves (211) arranged on a bottom surface of the upper dough hook hub (11) and an upper surface of the lower dough hook hub (21) respectively.

13. The counter-rotating dough making mechanism of claim 10, further comprising gear grooves (211) arranged on a bottom surface of the upper dough hook hub (11) and an upper surface of the lower dough hook hub (21) respectively.

14. The counter-rotating dough making mechanism of claim 6, wherein an inner curvature of the upper dough hook (12) and the lower dough hook (22) is between about 45° to about 90°.

15. The counter-rotating dough making mechanism of claim 6, wherein an inner curvature of the upper dough hook (12) and the lower dough hook (22) is about 75°.

16. A counter-rotating dough making mechanism comprising:
an upper dough hook assembly (1), a lower dough hook assembly (2) and a gearing assembly (4) in a coaxial arrangement about a drive shaft (9);
wherein the upper dough hook assembly (1) comprises an upper dough hook (12) detachably connected to an upper dough hook hub (11); and
the lower dough hook assembly (2) comprises a lower dough hook (22) detachably connected to a lower dough hook hub (21);
a coupling ring (5) arranged between the drive shaft (9) and the upper dough hook hub (11); the upper dough hook hub (11) is connected with the lower end of the coupling ring (5), and the lower dough hook hub (21) and the upper dough hook hub (11) are sequentially nested on the coupling ring (5); and
wherein the gearing assembly (4) is arranged between the upper dough hook assembly (1) and the lower dough hook assembly (2) to transfer rotational movement between the assemblies (1, 2).

17. The counter-rotating dough making mechanism of claim 16, further comprising a washer (6) arranged between the drive shaft (9) and the coupling ring (5); and a shaft ring (7) is arranged at the lower end of the drive shaft (9).

* * * * *